United States Patent [19]
Sakatani et al.

[11] Patent Number: 5,397,056
[45] Date of Patent: Mar. 14, 1995

[54] FULLY-AUTOMATIC SPRAYING SYSTEM EMPLOYING SPRAY CAR

[75] Inventors: Naoki Sakatani; Yukio Ogihara, both of Ome; Junichi Akaike, Chofu; Nori Harada, Ome, all of Japan

[73] Assignee: Kioritz Corporation, Tokyo, Japan

[21] Appl. No.: 831,704

[22] Filed: Feb. 5, 1992

[30] Foreign Application Priority Data

Feb. 6, 1991 [JP] Japan .................. 3-004212 U

[51] Int. Cl.⁶ .................. B05B 3/18; B61C 11/00
[52] U.S. Cl. .................. 239/173; 239/745; 239/197; 180/198; 104/296
[58] Field of Search ............ 239/195, 197, 752, 173, 239/745; 180/168, 198; 104/296

[56] References Cited

U.S. PATENT DOCUMENTS

| | | | |
|---|---|---|---|
| Re. 33,746 | 11/1991 | Lucas | 239/195 X |
| 4,074,856 | 2/1978 | Williams et al. | 239/197 X |
| 4,181,257 | 1/1980 | Moisan | 239/195 X |
| 4,352,463 | 10/1982 | Baker | 239/197 X |
| 5,029,665 | 7/1991 | Harada | 180/198 |
| 5,097,770 | 3/1992 | Miyashita et al. | 180/198 X |

*Primary Examiner*—Andres Kashnikow
*Assistant Examiner*—William Grant
*Attorney, Agent, or Firm*—Browdy and Neimark

[57] ABSTRACT

The present invention relates to a fully-automatic spraying system employing a spray car. The system includes a spray car body and a truck on which the spray car body is mounted so that the spray car body can be loaded onto and unloaded from the truck. A reel around which a spray-feeding hose is wound is rotatably mounted on the truck. The reel is drivingly connected to an axle of the truck.

1 Claim, 4 Drawing Sheets

FULLY-AUTOMATIC SPRAYING SYSTEM EMPLOYING SPRAY CAR

BACKGROUND OF THE INVENTION

The present invention relates to a fully-automatic spraying system employing a spray car.

Fully-automatic spraying systems have hitherto been employed which use spray cars or so-called robot spray cars automatically moving back and forth in furrows between ridges to sprinkle water or chemicals when, for example, vegetables are cultivated in greenhouses. FIG. 4 shows such a fully-automatic spraying system. In FIG. 4, numeral 1 denotes a spray container fixed outside a greenhouse 2; numeral 3, a pump for drawing up a spraying liquid from the container 1; and numeral 4, a pair of rails laid in a head land 6 so as to extend perpendicularly to ridges 5. Numeral 7 denotes a truck reciprocating on the rails 4, and numeral 8 denotes a motor-driven spray car mounted on the truck 7 so that the car 8 can be loaded on or unloaded from the truck 7. The spray car 8 uses front wheels 28 as driving wheels to move back and forth along furrows 9 between the ridges 5. Reference character 10A denotes a hose for feeding the spraying liquid from the container 1 to the pump 3; 10B, a hose for returning excessive spraying liquid from the pump 3 to the container 1; and 11, a high-pressure hose for feeding the spraying liquid under pressure to a spray device 8A of the spray car 8. Reference character 12a denotes a wire for hanging the high-pressure hose 11 in many loops from hooks 12B. The wire 12A is stretched parallel to the rails 4 so as to move back and forth. The high-pressure hose 11 is extended into the spray car 8 and is wound around a reel 8, inside the spray car 8 and is connected to the spray device 8A. The high-pressure hose 11 is wound onto or from the reel inside the spray car 8 as the spray car 8 moves back and forth in the furrows 9 between the ridges 5.

Even when the spray car 8 is loaded onto the truck 7, the front wheels 28 continue to rotate, thus rotating a mesh roller 13 serving as a stopper. The rotative driving force of the mesh roller 13 causes the truck 7, on which the spray car 8 is mounted, to move on the rails 4.

In the conventional system thus constructed, equipment is required to stretch the wire 12A which hangs the high-pressure hose 11 from the ceiling of the greenhouse 2, thus increasing the cost of equipment. Also, since the high-pressure hose 11 in many loops hangs from the wire 12A, it is inconvenient to work in the greenhouse 2.

SUMMARY OF THE INVENTION

The object of the present invention is to provide a fully-automatic spraying system employing a spray car, which system makes it possible to provide a broader working space without the need for a wire which hangs a high-pressure hose as in the conventional art. As a result, the cost of operating decreases, and working efficiency improves.

To achieve the above object, in accordance with one aspect of this invention, there is provided a fully-automatic spraying system employing a spray car, comprising: a spray car body; a truck on which the spray car body is mounted so that the spray car body can be loaded onto and unloaded from the truck; and a reel for winding a spray-feeding hose around it, the reel being rotatably mounted on the truck and drivingly connected to an axle of the truck.

PREFERRED EMBODIMENT OF THE INVENTION

The present invention will be described below with reference to the drawings.

Figure 1:
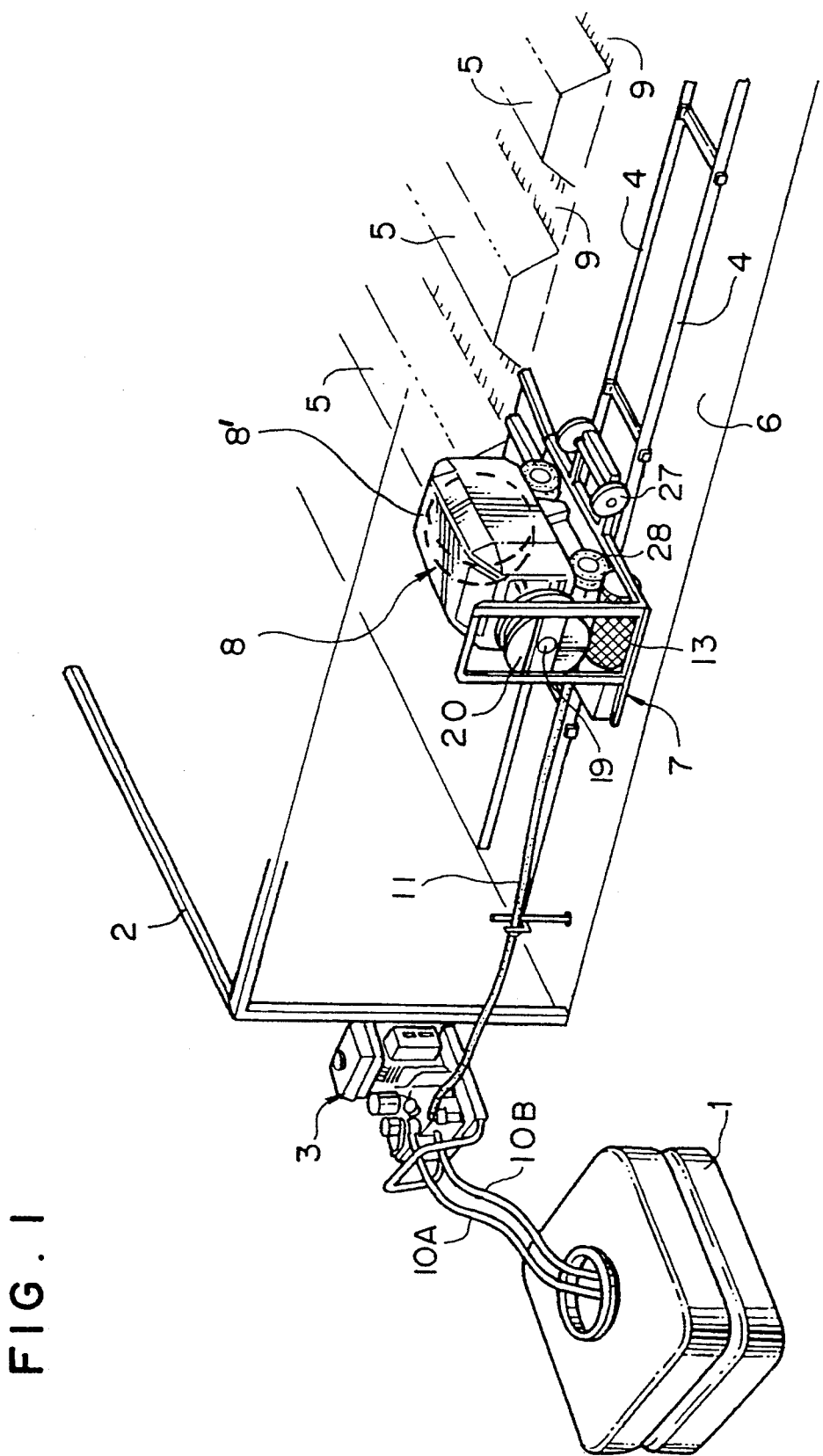
FIG. 1 is a perspective view showing a fully-automatic spraying system employing a spray car according to the present invention.
Figure 2:
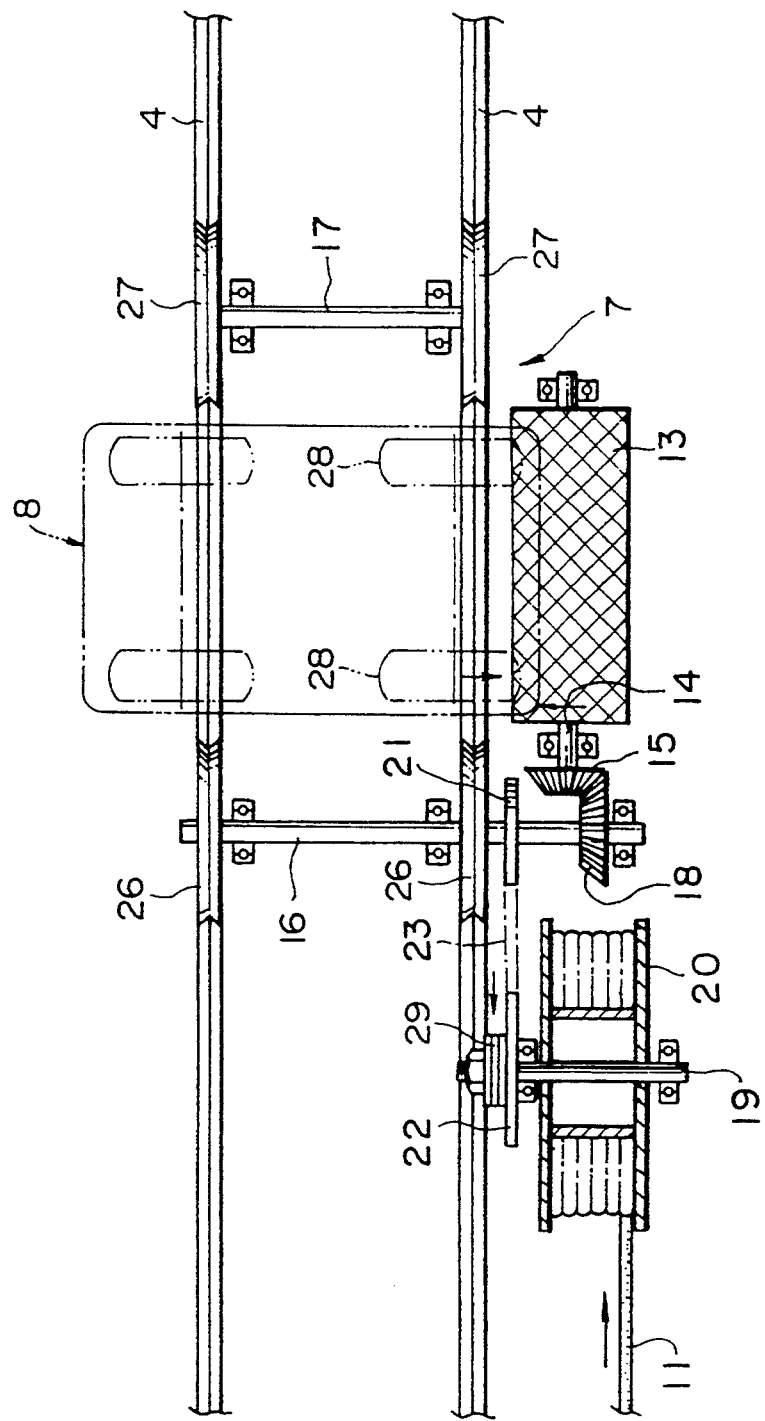
FIG. 2 is a schematic plan view illustrating a truck portion, which is a driving portion, of the system shown in FIG. 1.
Figure 4:
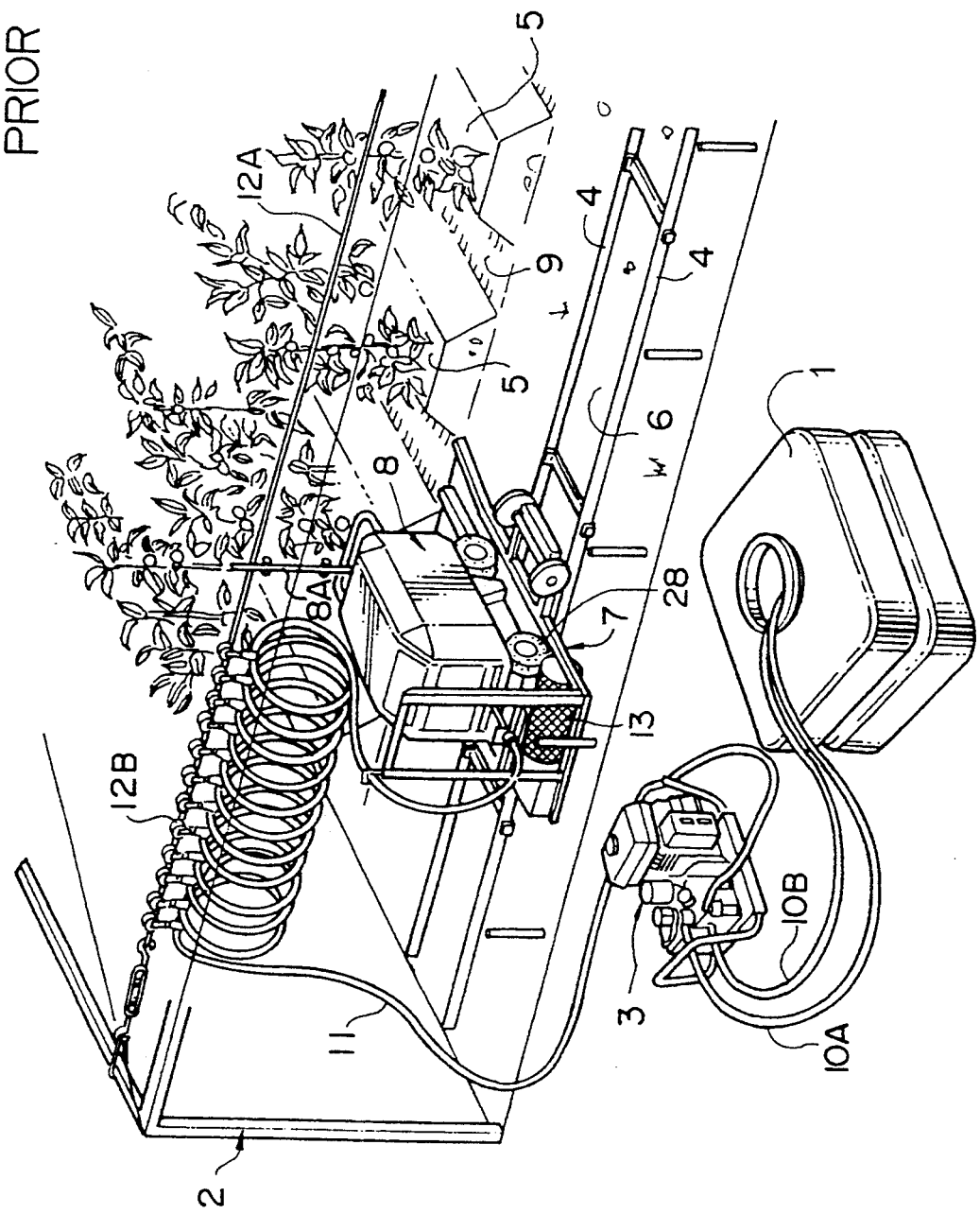
FIG. 4 is a perspective view showing the conventional spraying system employing the spray car.

FIG. 1 is a perspective view showing a fully-automatic spraying system employing a spray car according to this invention. In FIG. 1, the same reference characters as those in FIG. 4 denote similar devices or components, which are constructed and operate in the same manner as in FIG. 4. Explanations of these devices or components are omitted.

Figure 3:
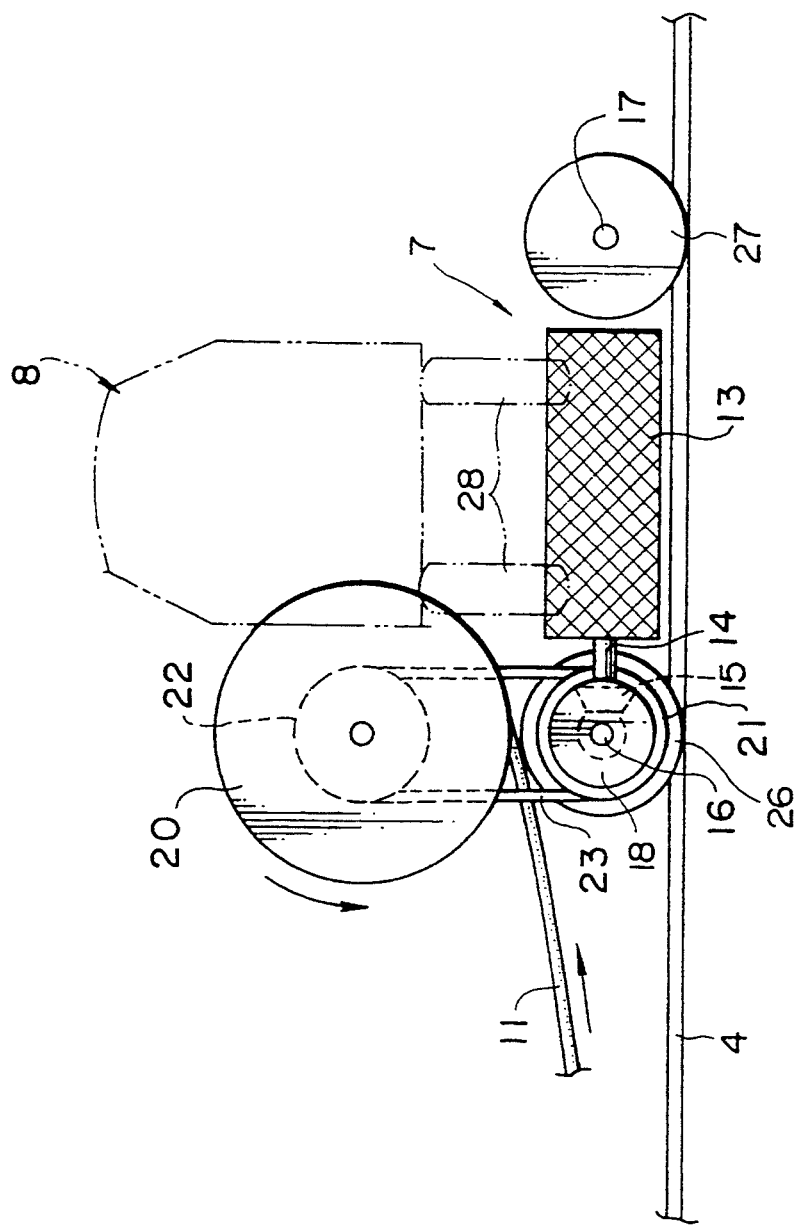
FIG. 3 is a schematic side view showing the truck portion shown in FIG. 2.

A truck 7 uses a mesh roller 13 as its driving power source to reciprocate on rails 4. As shown in FIG. 3, a driving bevel gear 15 attached to a driving shaft 14 of the mesh roller 13 engages with a driven bevel gear 18 attached to an axle 16. The axle 16 and another axle 17 are used to fix wheels 26 and 27 to the truck 7. The driving force of the mesh roller 13 is transmitted through the bevel gears 15 and 18 to the axle 16, thereby reciprocating the truck 7 on the rails 4. The truck 7 supports a hollow reel shaft 19 disposed parallel to the axle 16 so that the shaft 19 can rotate (for the sake of clarity, the position of the hollow reel shaft shown in FIG. 1 differs from that shown in FIG. 3). A reel 20 is secured to the reel shaft 19. A high-pressure hose 11 extending from a pump 3 into a greenhouse 2 is wound around the reel 20, thus forming many coils. A driving pulley 21 is secured to the axle 16, and a driven pulley 22 is secured to one end of the reel shaft 19. As shown in FIG. 3, an endless belt 23 is stretched between the pulleys 21 and 22. When the truck 7 is in operation, the endless belt 23 transmits the turning force of the axle 16 to the reel shaft 19. If driving wheels 28 are rotated in a reverse direction while the truck 7 is moving leftward in FIG. 3, that is, in the retreat direction, the high-pressure hose 11 is wound around the reel 20. On the other hand, while the truck 7 is moving in the opposite direction, that is, in the forward direction, the high-pressure hose 11 is let out from the reel 20. Though not shown, the end of the high-pressure hose 11 on the reel 20 is connected to the hollow reel shaft 19 and further to an outer end of the high-pressure hose wound around another reel 8, inside the spray car 8.

In the embodiment shown, a transmission device composed of the endless belt 23 is also used as a slip clutch which compensates differences in the speed of winding the high-pressure hose 11. These differences are caused by the diameter of the high-pressure hose 11 being used. However, the fully-automatic spraying system may also be constructed in the following manner. When a chain is used to transmit the turning force of the axle 16, the slip clutch is interposed between the reel shaft 19 and the driven pulley 22, and a one-way clutch is provided. Thus while the truck 7 is moving forward, the high-pressure hose 11 is let out smoothly from the reel 20.

What is claimed is:

1. A fully-automatic spraying system, comprising:
   a motor-driven spray car body having therein a first reel and a first spray-feeding hose wound thereon;
   said first spray-feeding hose being wound onto or from said first reel inside said spray car body;
   a truck on which said motor-driven spray car body is mounted so that said motor-driven spray car body can be mounted onto and unloaded from said truck; and
   a second reel having a second spray-feeding hose wound thereon, said first spray-feeding hose being fluidly connected to said second spray-feeding hose, said second reel being rotatably mounted on said truck and drivingly connected to a driving wheel axle of said truck and driven by said motor-driven spray car when said motor-driven spray car is mounted onto said truck and not driven when said motor-driven spray car body is unloaded from said truck;
   wherein said first reel permits extension of said first spray-feeding hose between said spray car body and said truck and said second reel permits extension of said second spray feeding hose between said truck and a pump.

* * * * *